(12) United States Patent
Day

(10) Patent No.: US 11,612,850 B2
(45) Date of Patent: Mar. 28, 2023

(54) PRESSURE EQUALIZING SYSTEM FOR AIR SEPARATION PURIFICATION AND CONTROL METHOD

(71) Applicant: L'Air Liquide, Societe Anonyme pour l'Etude et l'Exploitation des Procedes Georges Claude, Paris (FR)

(72) Inventor: Eric Day, Hangzhou (CN)

(73) Assignee: L'Air Liquide, Societe Anonyme Por L'Etude Et L'Exploitation Des Procedes Georges Claude, Paris (FR)

( * ) Notice: Subject to any disclaimer, the term of this patent is extended or adjusted under 35 U.S.C. 154(b) by 197 days.

(21) Appl. No.: 17/082,819

(22) Filed: Oct. 28, 2020

(65) Prior Publication Data

US 2021/0138387 A1 May 13, 2021

(30) Foreign Application Priority Data

Nov. 8, 2019 (CN) .......................... 201911088104.1

(51) Int. Cl.
*B01D 53/04* (2006.01)
*B01D 53/26* (2006.01)
*B01D 53/047* (2006.01)

(52) U.S. Cl.
CPC ....... *B01D 53/0454* (2013.01); *B01D 53/047* (2013.01); *B01D 53/0446* (2013.01); *B01D 53/261* (2013.01)

(58) Field of Classification Search
None
See application file for complete search history.

(56) References Cited

U.S. PATENT DOCUMENTS

| 3,738,084 A | 6/1973 | Simonet et al. |
| 4,233,038 A | 11/1980 | Tao |
| | (Continued) | |

FOREIGN PATENT DOCUMENTS

| CN | 102 430 317 | 5/2012 |
| CN | 104 066 493 | 9/2014 |
| | (Continued) | |

OTHER PUBLICATIONS

Anonymous, "Method of Repressurising the Pretreatment PSA of a Cryogenic Air Separation Unit," originally published in Research Disclosure, Jun. 1999, p. 640, publ. No. 42160; ip.com Prior Art Database Technical Disclosure, IP.com No. IPCOM000019388D, IP.com Electronic Publication Date: Sep. 12, 2003.

(Continued)

*Primary Examiner* — Philip Y Louie
(74) *Attorney, Agent, or Firm* — Justin K. Murray

(57) ABSTRACT

Disclosed in the present invention are a pressure equalizing system for air separation purification, and a control method. The system comprises: a first air main pipe; a pressurizing gas pipeline, which is connected to the first air main pipe and used for receiving a pressurizing gas and delivering same to the first air main pipe; and a control valve, located on the pressurizing gas pipeline, and having a degree of opening regulated by the flow regulator, thereby regulating an air intake amount of the pressurizing gas pipeline. The present invention solves the problem of an air separation rectification process being affected when dry nitrogen is used for pressure equalization of an adsorber; in the switching process of entering an adsorption stage from a regeneration stage, pressurizing dry nitrogen used in a pressure equalizing step previously mixes with damp air from a main air compressor before entering the adsorber, such that the gas components flowing towards an air separation cold box (Continued)

remain substantially unchanged, in order to reduce disturbance in conditions of gas entering a rectification column to take part in rectification due to a gas component gradually changing from dry nitrogen to dry air in the prior art, thus stabilizing the process conditions of the air separation cold box.

10 Claims, 1 Drawing Sheet

(56) References Cited

U.S. PATENT DOCUMENTS

| | | |
|---|---|---|
| 5,137,548 A | 8/1992 | Grenier et al. |
| 5,258,056 A * | 11/1993 | Shirley ............... B01D 53/047 95/138 |
| 5,531,808 A | 7/1996 | Ojo et al. |
| 5,587,003 A | 12/1996 | Bulow et al. |
| 5,906,674 A | 5/1999 | Tan et al. |
| 6,073,463 A | 6/2000 | Espie |
| 6,599,347 B2 | 7/2003 | Kalbassi et al. |
| 6,607,582 B2 | 8/2003 | Massimo et al. |
| 6,821,316 B2 | 11/2004 | Guillard et al. |
| 7,846,237 B2 | 12/2010 | Wright et al. |
| 9,403,118 B2 | 8/2016 | Sakamoto et al. |
| 9,795,915 B2 | 10/2017 | Kalbassi et al. |
| 10,035,099 B2 | 7/2018 | Yoshikawa et al. |
| 10,895,417 B2 | 1/2021 | Kong et al. |
| 2002/0108377 A1 | 8/2002 | Guillard |
| 2004/0221612 A1 | 11/2004 | Jaouani et al. |
| 2010/0024640 A1 | 2/2010 | Blouin |
| 2013/0319228 A1 | 12/2013 | Golden et al. |
| 2014/0013798 A1 | 1/2014 | Le Bot |
| 2017/0087505 A1 | 3/2017 | Hashi et al. |
| 2017/0276428 A1 | 9/2017 | Kong et al. |

FOREIGN PATENT DOCUMENTS

| | | |
|---|---|---|
| CN | 204 247 027 | 4/2015 |
| CN | 108 619 859 | 10/2018 |
| CN | 208 332 861 | 1/2019 |
| CN | 208 493 709 | 2/2019 |
| EP | 1 219 910 | 7/2002 |
| FR | 2 849 172 | 6/2004 |
| JP | H04 121577 | 4/1992 |
| JP | 5 010 772 | 8/2012 |
| SU | 890042 | 12/1981 |
| SU | 1270508 | 11/1986 |
| WO | WO 2007 033 838 | 3/2007 |
| WO | WO 2013 038315 | 3/2013 |

OTHER PUBLICATIONS

EP Search Report for EP 20 205 358.3, dated Mar. 1, 2021.

* cited by examiner

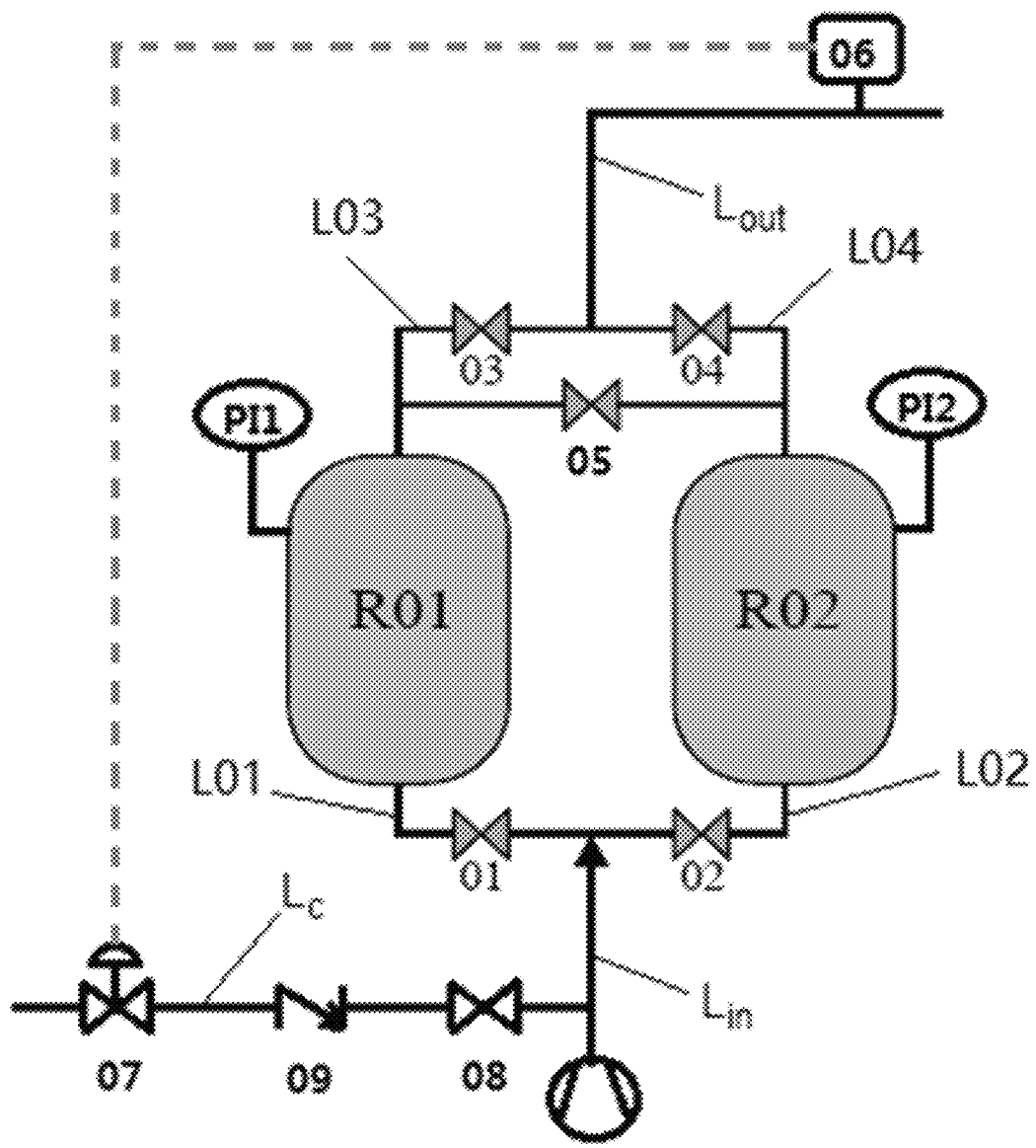

PRESSURE EQUALIZING SYSTEM FOR AIR SEPARATION PURIFICATION AND CONTROL METHOD

CROSS REFERENCE TO RELATED APPLICATIONS

This application claims the benefit of priority under 35 U.S.C. § 119 (a) and (b) to Chinese patent application No. CN201911088104.1, filed Nov. 8, 2019, the entire contents of which are incorporated herein by reference.

FIELD OF THE INVENTION

The present invention relates to the technical field of air separation, in particular to a pressure equalizing system for air separation purification and a control method.

BACKGROUND OF THE INVENTION

An air separation plant purifies feedstock air (damp air containing impurities) from a main air compressor by means of two adsorbers arranged in parallel. The two adsorbers operate in an alternately switched fashion, i.e. when a first adsorber is adsorbing impurities in feedstock air until an adsorbent thereof is saturated, a second adsorber is in a regeneration stage, and once the adsorbent of the first adsorber is saturated, the process switches to the second adsorber adsorbing impurities in the feedstock air, at which time the first adsorber begins a regeneration stage thereof, and this alternation is repeated to produce dry air needed for air separation rectification.

An adsorption stage is a process in which water, carbon dioxide, acetylene and other hydrocarbons, etc. in the damp air are adsorbed to produce dry air when the feedstock air from the main air compressor passes through the adsorbent. If the impurities were not removed before entry into an air separation cold box, water and carbon dioxide frozen by cooling would be deposited in the low-temperature heat exchanger, turbine expander or rectification column, and would thus block heat exchange passageways, pipelines and valves. The accumulation of acetylene in liquid oxygen further poses an explosion risk, and the air separation plant will suffer faults or damage as a result. Thus, the function of an air separation purification system is to remove impurities such as water, acetylene and carbon dioxide contained in air, and thereby ensure the long-term, safe and reliable operation of the air separation plant.

Adsorbents commonly used in air separation purification systems include molecular sieves and alumina. When the adsorbent becomes saturated and unable to continue adsorbing impurities, the maximum adsorption capacity of the adsorbent has been reached, at which time the adsorbent must be regenerated, to release water and carbon dioxide, etc. on the surface of the adsorbent material.

The regeneration stage generally comprises: (1) depressurizing the adsorber to close to atmospheric pressure; (2) regenerating the adsorbent at atmospheric pressure by introducing heated gas, wherein the hot gas is generally dirty nitrogen from the air separation cold box; (3) cooling the adsorbent, introducing unheated dirty nitrogen from the air separation cold box into the adsorber; (4) using dry air generated by the adsorber in the adsorption stage to perform pressure equalization, until the two adsorbers are at equal pressures; (5) the feedstock air flows through the two adsorbers simultaneously, a pressure equalizing valve is closed, and the regeneration stage ends.

The operating cycle of the adsorber comprises the adsorption stage and the regeneration stage, wherein the regeneration stage consists of steps (1) to (5) above. The operating time of the adsorption stage and the operating time of the regeneration stage are the same, i.e. the operating time of the adsorption stage is the same as the total duration of steps (1) to (5), and the two adsorbers are switched halfway through the duration of the entire operating cycle.

In the pressure equalizing step (4), 3%-5% of the feedstock air is generally used to pressurize the adsorber at atmospheric pressure. In the prior art, to maintain a constant flow rate of dry air towards the air separation cold box, it is necessary to increase the degree of opening of an air intake guide vane of the main air compressor and increase the flow rate of feedstock air flowing towards the adsorber; when the pressure equalizing step ends, due to the fact that there is no longer any loss in flow rate of dry air used for pressurization, the air intake guide vane of the main air compressor must again be adjusted to its original degree of opening, until the next pressure equalization, when the degree of opening of the air intake guide vane is increased again. Thus, the adsorber pressure equalizing step will result in frequent adjustment of the air intake guide vane of the main air compressor, such that the main air compressor cannot operate at substantially constant capacity, resulting in disturbance to the air separation operating state. Moreover, it is necessary to purchase a main air compressor of greater capacity than is needed, resulting in higher equipment investment, which is not economical.

To solve this problem, US2017/0276428 in the prior art has disclosed a method that enables the main air compressor to operate at substantially constant capacity (i.e. with no need to increase the degree of opening of the air intake guide vane of the main air compressor in the adsorber pressure equalizing step), while maintaining a substantially constant flow rate of dry air towards the air separation cold box. In one embodiment of US2017/0276428, dry nitrogen is used to pressurize the adsorber, with no need for any loss of feedstock air flow rate from the main air compressor, and the objective of having the main air compressor operate at substantially constant capacity can be achieved. The dry nitrogen may come from an external gas source, but may also be a pressurized nitrogen product from the air separation cold box.

However, the technical solution proposed in US2017/0276428, in which the adsorber pressure equalizing step uses dry nitrogen, still has the problem of the air separation rectification process being affected; this is because the adsorber will enter the adsorption stage when the pressure equalizing step has ended, and in the course of switching, a gas component flowing towards the air separation cold box from the adsorber gradually changes from dry nitrogen to dry air, with the result that gas entering the downstream air separation cold box (in particular the rectification column) to take part in rectification experiences fluctuation in conditions, and the process conditions of the air separation cold box are thus disturbed.

To avoid the situation where a gas component flowing towards the air separation cold box changes from dry nitrogen to dry air in the course of switching described above, and minimize such disturbance, the question of how to design a novel pressure equalizing system for air separation purification and control method, to eliminate the abovementioned defects and shortcomings in the prior art, is an issue that is in urgent need of solution by those skilled in the art.

SUMMARY OF THE INVENTION

To achieve the above object of the invention, certain embodiments of the present invention disclose a pressure equalizing system for air separation purification, the system comprising: a first adsorber and a second adsorber arranged in parallel; a first air main pipe, located upstream of air intake ends of the adsorbers, and used for receiving damp air from a main air compressor; a first air intake branch pipe, for connecting the first air main pipe to the air intake end of the first adsorber; a second air intake branch pipe, for connecting the first air main pipe to the air intake end of the second adsorber; a second air main pipe, located downstream of air output ends of the adsorbers, and used for delivering a flow of dry air that has been purified in the adsorbers to an air separation cold box; a first air output branch pipe, for connecting the second air main pipe to the air output end of the first adsorber; a second air output branch pipe, for connecting the second air main pipe to the air output end of the second adsorber; a pressure equalizing valve, connected to the first air output branch pipe and the second air output branch pipe separately by pipelines; a flow regulator, located on the second air main pipe, and used for measuring a flow rate of dry air in the second air main pipe, wherein: the system further comprises a pressurizing gas pipeline, which is connected to the first air main pipe and used for receiving a pressurizing gas and delivering same to the first air main pipe; and a control valve, located on the pressurizing gas pipeline, and having a degree of opening regulated by the flow regulator, thereby regulating an air intake amount of the pressurizing gas pipeline.

Furthermore, the system further comprises a first air intake valve and a second air intake valve, located on the first air intake branch pipe and the second air intake branch pipe respectively; a first air output valve and a second air output valve, located on the first air output branch pipe and the second air output branch pipe respectively; a first pressure transmitter and a second pressure transmitter, connected to the first adsorber and the second adsorber respectively, and used for measuring pressures of the first adsorber and the second adsorber respectively.

Furthermore, the system further comprises a switch valve and a one-way valve, both located on the pressurizing gas pipeline.

Furthermore, the system is controlled by a distributed control system DCS.

Furthermore, the pressurizing gas consists of one or more of dry nitrogen, dry air and/or damp air.

Furthermore, the pressurizing gas does not come from the main air compressor.

Furthermore, the system further comprises a first air intake valve and a second air intake valve, located on the first air intake branch pipe and the second air intake branch pipe respectively; a first air output valve and a second air output valve, located on the first air output branch pipe and the second air output branch pipe respectively; a first pressure transmitter and a second pressure transmitter, connected to the first adsorber and the second adsorber respectively, and used for measuring pressures of the first adsorber and the second adsorber respectively; a switch valve and a one-way valve, both located on the pressurizing gas pipeline; and a distributed control system DCS, for controlling the pressure equalizing system for air separation purification.

Certain embodiments of the present invention further provide a control method for a pressure equalizing system for air separation purification, the control method at least comprising the following steps: when the first adsorber is in an adsorption stage and the second adsorber is in a regeneration stage, the first air intake valve and first air output valve are in an open state, while the other valves are in a closed state; when it is necessary to subject the second adsorber to pressure equalization, the DCS slowly opens the pressure equalizing valve, to deliver a portion of dry air from the first adsorber to the second adsorber via the pressure equalizing valve to increase the pressure of the second adsorber; at the same time the DCS opens the switch valve on the pressurizing gas pipeline; the flow regulator on the second air main pipe measures a loss in flow rate of dry air flowing towards the air separation cold box, and regulates a degree of opening of the control valve of the pressurizing gas pipeline according to the loss in flow rate, such that the pressurizing gas is delivered to the first air main pipe through the pressurizing gas pipeline, to compensate for the loss in flow rate of dry air in the second air main pipe.

Furthermore, the following steps are further included: once values of the first pressure transmitter and second pressure transmitter are nearly equal, the flow regulator on the second air main pipe measures the loss in flow rate of dry air to be zero, the control valve on the pressurizing gas pipeline is closed, at the same time the DCS closes the switch valve, and the pressure equalizing step of the second adsorber ends.

Furthermore, the following steps are further included: when the first adsorber is in the regeneration stage and the second adsorber is in the adsorption stage, the second air intake valve and second air output valve are in an open state, while the other valves are in a closed state; when it is necessary to subject the first adsorber to pressure equalization, the DCS slowly opens the pressure equalizing valve, to deliver a portion of dry air from the second adsorber to the first adsorber via the pressure equalizing valve to increase the pressure of the first adsorber; at the same time the DCS opens the switch valve on the pressurizing gas pipeline; the flow regulator on the second air main pipe measures a loss in flow rate of dry air flowing towards the air separation cold box, and regulates a degree of opening of the control valve of the pressurizing gas pipeline according to the loss in flow rate, such that the pressurizing gas is delivered to the first air main pipe through the pressurizing gas pipeline, to compensate for the loss in flow rate of dry air in the second air main pipe.

Furthermore, the following steps are further included: once values of the first pressure transmitter and second pressure transmitter are nearly equal, the flow regulator on the second air main pipe measures the loss in flow rate of dry air to be zero, the control valve on the pressurizing gas pipeline is closed, at the same time the DCS closes the switch valve, and the pressure equalizing step of the first adsorber ends.

Compared with the prior art, the technical solution provided in certain embodiments of the present invention have the following advantages:

(1) Certain embodiments of the present invention solve the problem of the air separation rectification process being affected when dry nitrogen is used for pressure equalization of the adsorber; in the switching process of entering the adsorption stage from the regeneration stage, pressurizing dry nitrogen used in the pressure equalizing step previously mixes with damp air from the main air compressor before entering the adsorber, such that the gas components flowing towards the air separation cold box remain substantially unchanged, in order to reduce disturbance in conditions of gas entering the rectification column to take part in rectification due to a gas component gradually changing from dry nitrogen to dry air in the prior art, thus stabilizing the process conditions of the air separation cold box.

(2) Certain embodiments of the present invention doe not require frequent adjustment of the air intake guide vane of the main air compressor, thereby ensuring that the main air compressor operates at substantially constant capacity.

(3) Certain embodiments of the present invention do not require the purchase of a main air compressor of greater capacity than is needed, so equipment investment is reduced, and certain embodiments of the present invention is economical.

(4) The flow regulator that originally regulated the air intake guide vane of the main air compressor is used to regulate the degree of opening of the control valve in certain embodiments of the present invention, thereby controlling the air intake amount of the pressurizing gas pipeline; this control method is simpler and more convenient.

BRIEF DESCRIPTION OF THE DRAWINGS

Further understanding of the advantages and spirit of the present invention can be gained through the following detailed description of the invention and the accompanying drawings.

The FIGURE is a schematic structural view of a preferred embodiment provided in the present invention.

DETAILED DESCRIPTION OF THE INVENTION

Specific embodiments of the present invention are explained in detail below in conjunction with the accompanying drawings. However, the present invention should be understood to not be limited to embodiments such as those described below, and the technical solution of the present invention may be implemented in combination with other well-known technologies or other technologies having the same function as those well-known technologies.

Unless stated otherwise, qualifiers similar to "first" and "second" appearing herein do not indicate a definition of chronological order, quantity or importance, but are merely intended to distinguish one technical feature in this technical solution from another technical feature. Similarly, unless modified by a specific quantity measure word, nouns herein should be regarded as including both singular and plural forms, i.e. the technical solution may include a single one of the technical feature concerned, but may also include a plurality of the technical feature.

In the present invention, unless otherwise clearly specified and defined, terms such as "connected together" or "connected" should be understood in a broad sense, e.g. may mean connected in a fixed manner, but may also mean removably connected, or forming a single piece; may mean mechanically connected; may mean directly connected together, but may also mean connected indirectly via an intermediate medium; and may mean internal communication between two elements, or an interactive relationship between two elements. Those skilled in the art can understand the specific meaning of the above terms in the present invention according to the specific circumstances.

In this text, the source of the "pressurizing gas" should not be from the main air compressor, and the sources of the pressurizing gas and damp air for adsorber purification are thereby distinguished, thus avoiding a loss in flow rate of dry air flowing towards a second air main pipe (air output main pipe) of the air separation cold box that is caused by a portion of purified dry air being used as pressurizing gas in the pressure equalizing step. Preferably, the pressurizing gas consists of one or more of dry nitrogen, dry air and/or damp air, wherein stored dry nitrogen, dry air and/or damp air may be used, or pressurized nitrogen (e.g. dirty nitrogen or a low-pressure nitrogen product) from the air separation cold box may be used. The pressurizing gas may also be pressurized oxygen and/or pressurized argon, but this would not be economical.

Specific embodiments of the present invention are explained in detail below in conjunction with The FIGURE.

The basic composition of an air separation purification system comprises: a first adsorber R01 and a second adsorber R02 arranged in parallel, with a molecular sieve layer and an alumina layer being packed in each adsorber by providing three layers of grilles (the molecular sieve being packed between an inner grille and a middle layer grille, and the alumina being packed between the middle layer grille and an outer grille), wherein when the adsorber is in the adsorption stage, damp air enters through an air intake end at the bottom of the adsorber, first passing through the alumina layer to remove moisture from the damp air, and then passing through the molecular sieve layer to remove carbon dioxide and acetylene and other hydrocarbons, such that purified, damp air is finally discharged through a filter from an air output end at the top of the adsorber; a first air main pipe Lin (air intake main pipe) for receiving damp air from the main air compressor, being located upstream of the air intake ends of the adsorbers, and being in communication with the air intake end of the first adsorber R01 and the air intake end of the second adsorber R02 via a first air intake branch pipe L01 and a second air intake branch pipe L02 respectively; a first air intake valve 01 and a second air intake valve 02 being provided on the first air intake branch pipe L01 and second air intake branch pipe L02 respectively; a second air main pipe Lout (air output main pipe) for delivering a flow of dry air that has been purified in the adsorbers to the air separation cold box, being located downstream of the air output ends of the adsorbers, and being in communication with the air output end of the first adsorber R01 and the air output end of the second adsorber R02 via a first air output branch pipe L03 and a second air output branch pipe L04 respectively; a first air output valve 03 and a second air output valve 04 being provided on the first air output branch pipe L03 and second air output branch pipe L04 respectively; a pressure equalizing valve 05, being connected to the first air output branch pipe L03 and second air output branch pipe L04 separately by pipelines, i.e. connected to the air output end of the first adsorber R01 and the air output end of the second adsorber R02 separately; a flow regulator 06 located on the second air main pipe Lout (air output main pipe) (in the prior art, this flow regulator is used to regulate the degree of opening of the air intake guide vane of the main air compressor); a first pressure transmitter PI1 and a second pressure transmitter PI2, being connected to the first adsorber R01 and second adsorber R02 respectively, and used to measure the pressures of the first adsorber R01 and second adsorber R02. When the first adsorber R01 is in the adsorption stage, the first air intake valve 01 and first air output valve 03 are opened, and the second air intake valve 02 and second air output valve 04 are closed, such that the first air main pipe Lin (air intake main pipe), first air intake branch pipe L01, first adsorber R01, first air output branch pipe L03 and second air main pipe Lout (air output main pipe) are in a state of communication with each other; and when the second adsorber R02 is in the adsorption stage, the second air intake valve 02 and second air output valve 04 are opened, and the first air intake valve 01 and first air output valve 03 are closed, such that the first air main pipe Lin (air intake main pipe), second air intake branch pipe L02, second adsorber R02, second air output branch pipe L04 and second air main pipe Lout (air output main pipe) are in a state of communication with each other. Both the opening and closing of the valves mentioned above are controlled by a DCS, i.e. the DCS activates each step under a certain condition (a valve opening/closing feedback signal, an attained process condition, etc.); if an opposite action is not activated, all actions (valve opening or closing commands) in each step will be maintained in the next step.

Taking the basic composition of the air separation purification system as a starting point, the present invention adds a pressurizing gas pipeline Lc, which is connected to the first air main pipe Lin (air intake main pipe), and used for receiving pressurizing gas and delivering same to the first air main pipe Lin (air intake main pipe); a switch valve 08, a one-way valve 09 and a control valve 07 are provided on the pressurizing gas pipeline Lc. The opening and closing of the switch valve 08 are controlled by the DCS, which only has two action states, specifically opening and closing. The function of the one-way valve 09 is to prevent counterflow of pressurizing gas or even damp air from the first air main pipe Lin (air intake main pipe), which would cause damage to the pipelines. The degree of opening of the control valve 07 is regulated by the flow regulator 06 located on the second air main pipe Lout (air output main pipe). When the main air compressor is operating at substantially constant capacity, i.e. the amount of damp air coming from the main air compressor is constant (suppose that it is Q, in units of $Nm^3/h$), then in theory, a flow of dry air with flow rate Q towards the air separation cold box is produced after purification in the adsorber. Suppose that in the pressure equalizing step, 3% of the dry air is delivered to the adsorber in the regeneration stage from the adsorber in the adsorption stage via the pressure equalizing valve 05; at this time, the flow regulator 06 located on the second air main pipe Lout (air output main pipe) measures the loss in flow rate of dry air flowing towards the air separation cold box, and regulates the degree of opening of the control valve 07 of the pressurizing gas pipeline Lc according to the loss in flow rate, such that about 3% of the flow rate Q of pressurizing gas is delivered to the first air main pipe Lin (air intake main pipe) through the pressurizing gas pipeline Lc, and mixes with damp air from the main air compressor before entering the adsorber in the adsorption stage together with the damp air, in order to compensate for the loss in flow rate of dry air in the second air main pipe Lout (air output main pipe), and achieve the objective of a substantially constant flow rate of dry air towards the air separation cold box (theoretically equal to Q). Once the values of the first pressure transmitter PI1 and second pressure transmitter PI2 are nearly equal, i.e. the absolute value of the difference therebetween ≤a set value of 15 kPa, pressure equalization is considered to be finished; since there is no longer any loss in flow rate of dry air used for pressurization, at this time the flow regulator 06 located on the second air main pipe Lout (air output main pipe) measures the loss in flow rate of dry air to be zero, the control valve 07 on the pressurizing gas pipeline Lc is closed, and at the same time the DCS closes the switch valve 08, and the adsorber pressure equalizing step ends. In the pressure equalizing step, dry nitrogen for pressurization enters the adsorber after mixing with damp air from the main air compressor, such that the gas components in the adsorber that will imminently switch from the regeneration stage to the adsorption stage can remain substantially unchanged; in this switching process, the gas components flowing towards the air separation cold box also remain substantially unchanged, so the process conditions of the air separation cold box are stabilized.

Embodiment 1

The operating procedure of certain embodiments of the present invention is described in detail below, in the case where the first adsorber is in the adsorption stage and the second adsorber is undergoing pressure equalization (the regeneration stage).

When the first adsorber R01 is in the adsorption stage and the second adsorber R02 is in the regeneration stage, the first air intake valve 01 and first air output valve 03 are in an open state, while the other valves are in a closed state. When a program switched operating time controlled by the DCS reaches the pressure equalizing step of the second adsorber R02, the DCS slowly opens (by gradient control) the pressure equalizing valve 05, to deliver a portion of dry air from the first adsorber R01 to the second adsorber R02 via the pressure equalizing valve 05 to increase the pressure of the second adsorber R02. At the same time the DCS opens the switch valve 08 on the pressurizing gas pipeline Lc. The flow regulator 06 on the second air main pipe Lout (air output main pipe) measures the loss in flow rate of dry air flowing towards the air separation cold box, and regulates the degree of opening of the control valve 07 of the pressurizing gas pipeline Lc according to the loss in flow rate, such that pressurizing gas is delivered to the first air main pipe Lin (air intake main pipe) through the pressurizing gas pipeline Lc, and mixes with damp air from the main air compressor before entering the first adsorber R01 together with the damp air, in order to compensate for the loss in flow rate of dry air in the second air main pipe Lout (air output main pipe). Once the absolute value of the difference value of the first pressure transmitter PI1 and second pressure transmitter PI2≤a set value of 15 kPa, the flow regulator 06 on the second air main pipe Lout (air output main pipe) measures the loss in flow rate of dry air to be zero, the control valve 07 on the pressurizing gas pipeline Lc is closed, and at the same time the DCS closes the switch valve 08; the pressure equalizing step of the second adsorber R02 ends, and parallel preparation work begins.

Embodiment 2

The operating procedure of certain embodiments of the present invention is described in detail below, in the case where the first adsorber is undergoing pressure equalization (the regeneration stage) and the second adsorber is in the adsorption stage.

When the first adsorber R01 is in the regeneration stage and the second adsorber R02 is in the adsorption stage, the second air intake valve 02 and second air output valve 04 are in an open state, while the other valves are in a closed state. When a program switched operating time controlled by the DCS reaches the pressure equalizing step of the first adsorber R01, the DCS slowly opens (by gradient control) the pressure equalizing valve 05, to deliver a portion of dry air from the second adsorber R02 to the first adsorber R01 via the pressure equalizing valve 05 to increase the pressure of the first adsorber R01. At the same time the DCS opens the switch valve 08 on the pressurizing gas pipeline Lc. The flow regulator 06 on the second air main pipe Lout (air output main pipe) measures the loss in flow rate of dry air flowing towards the air separation cold box, and regulates the degree of opening of the control valve 07 of the pressurizing gas pipeline Lc according to the loss in flow rate, such that pressurizing gas is delivered to the first air main pipe Lin (air intake main pipe) through the pressurizing gas pipeline Lc, and mixes with damp air from the main air compressor before entering the second adsorber R02 together with the damp air, in order to compensate for the loss in flow rate of dry air in the second air main pipe Lout (air output main pipe). Once the absolute value of the difference value of the first pressure transmitter PI1 and second pressure transmitter PI2≤a set value of 15 kPa, the flow regulator 06 on the second air main pipe Lout (air output main pipe) measures the loss in flow rate of dry air to be zero, the control valve 07 on the pressurizing gas pipeline Lc is closed, and at the same time the DCS closes the switch valve 08; the pressure equalizing step of the first adsorber R01 ends, and parallel preparation work begins.

The above are merely preferred particular embodiments of the present invention, which are merely intended to illustrate the technical solution of certain embodiments of the present invention without limiting the present invention. All technical solutions obtainable by those skilled in the art according to the concept of the present invention by logical analysis, reasoning or limited experiment should be included in the scope of the present invention.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A pressure equalizing system for air separation purification, the system comprising:
   a first adsorber and a second adsorber arranged in parallel;
   a first air main pipe, located upstream of air intake ends of the adsorbers, the first air main pipe being configured to receive damp air from a main air compressor;
   a first air intake branch pipe configured to connect the first air main pipe to the air intake end of the first adsorber;
   a second air intake branch pipe configured to connect the first air main pipe to the air intake end of the second adsorber;
   a second air main pipe, located downstream of air output ends of the adsorbers, the second air main pipe being configured to deliver a flow of dry air that has been purified in the adsorbers to an air separation cold box;
   a first air output branch pipe configured to connect the second air main pipe to the air output end of the first adsorber;
   a second air output branch pipe configured to connect the second air main pipe to the air output end of the second adsorber;
   a pressure equalizing valve, connected to the first air output branch pipe and the second air output branch pipe separately by pipelines;
   a flow regulator, located on the second air main pipe, the flow regulator being configured to measure a flow rate of dry air in the second air main pipe,
   a pressurizing gas pipeline, which is connected to the first air main pipe and configured to receive a pressurizing gas and delivering same to the first air main pipe;
   a control valve, located on the pressurizing gas pipeline, and having a degree of opening regulated by the flow regulator, such that the control valve is configured to regulate an air intake amount of the pressurizing gas pipeline; and
   wherein the system further comprises a switch valve and a one-way valve, both located on the pressurizing gas pipeline.

2. The pressure equalizing system for air separation purification according to claim 1, further comprising a first air intake valve and a second air intake valve, located on the first air intake branch pipe and the second air intake branch pipe respectively; a first air output valve and a second air output valve, located on the first air output branch pipe and the second air output branch pipe respectively; a first pressure transmitter and a second pressure transmitter, connected to the first adsorber and the second adsorber respectively, and configured to measure pressures of the first adsorber and the second adsorber respectively.

3. The pressure equalizing system for air separation purification according to claim 1, wherein the system is controlled by a distributed control system DCS.

4. The pressure equalizing system for air separation purification according to claim 1, wherein the pressurizing gas consists of one or more of dry nitrogen, dry air and/or damp air.

5. The pressure equalizing system for air separation purification according to claim 4, wherein the pressurizing gas does not come from the main air compressor.

6. A pressure equalizing system for air separation purification, the system comprising:
   a first adsorber and a second adsorber arranged in parallel;
   a first air main pipe, located upstream of air intake ends of the adsorbers, the first air main pipe being configured to receive damp air from a main air compressor;

a first air intake branch pipe configured to connect the first air main pipe to the air intake end of the first adsorber;

a second air intake branch pipe configured to connect the first air main pipe to the air intake end of the second adsorber;

a second air main pipe, located downstream of air output ends of the adsorbers, the second air main pipe being configured to deliver a flow of dry air that has been purified in the adsorbers to an air separation cold box;

a first air output branch pipe configured to connect the second air main pipe to the air output end of the first adsorber;

a second air output branch pine configured to connect the second air main pipe to the air output end of the second adsorber;

a pressure equalizing valve, connected to the first air output branch pipe and the second air output branch pipe separately by pipelines;

a flow regulator, located on the second air main pipe, the flow regulator being configured to measure a flow rate of dry air in the second air main pipe, a pressurizing gas pipeline, which is connected to the first air main pipe and configured to receive a pressurizing gas and delivering same to the first air main pipe;

a control valve, located on the pressurizing gas pipeline, and having a degree of opening regulated by the flow regulator, such that the control valve is configured to regulate an air intake amount of the pressurizing gas pipeline;

a first air intake valve and a second air intake valve, located on the first air intake branch pipe and the second air intake branch pipe respectively;

a first air output valve and a second air output valve, located on the first air output branch pipe and the second air output branch pipe respectively;

a first pressure transmitter and a second pressure transmitter, connected to the first adsorber and the second adsorber respectively, the first pressure transmitter being configured to measure pressures of the first adsorber and the second pressure transmitter being configured to measure pressures of the second adsorber respectively; and a switch valve and a one-way valve, both located on the pressurizing gas pipeline; and a distributed control system DCS, for controlling the pressure equalizing system for air separation purification.

7. A method for controlling a pressure equalizing system, the method comprising the steps of:

providing the pressure equalizing system for air separation purification according to claim 6, wherein when the first adsorber is in an adsorption stage and the second adsorber is in a regeneration stage, the first air intake valve and first air output valve are in an open state, while the other valves are in a closed state;

upon a determination that the second adsorber is to be subjected to pressure equalization, increasing the pressure of the second adsorber by using the DCS to slowly open the pressure equalizing valve, thereby delivering a portion of dry air from the first adsorber to the second adsorber via the pressure equalizing valve;

using the DCS to open the switch valve on the pressurizing gas pipeline; and measuring a loss in flow rate of dry air flowing towards an air separation cold box using the flow regulator on the second air main pipe, and regulating a degree of opening of the control valve of the pressurizing gas pipeline according to the loss in flow rate, such that the pressurizing gas is delivered to the first air main pipe through the pressurizing gas pipeline, to compensate for the loss in flow rate of dry air in the second air main pipe.

8. The method for controlling the pressure equalizing system according to claim 7, further comprising the following steps: once values of the first pressure transmitter and second pressure transmitter are nearly equal, the flow regulator on the second air main pipe measures the loss in flow rate of dry air to be zero, the control valve on the pressurizing gas pipeline is closed, at the same time the DCS closes the switch valve, and the pressure equalizing step of the second adsorber ends.

9. The method for controlling the pressure equalizing system according to claim 7, comprising the following steps: when the first adsorber is in the regeneration stage and the second adsorber is in the adsorption stage, the second air intake valve and second air output valve are in an open state, while the other valves are in a closed state; when it is necessary to subject the first adsorber to pressure equalization, the DCS slowly opens the pressure equalizing valve, to deliver a portion of dry air from the second adsorber to the first adsorber via the pressure equalizing valve to increase the pressure of the first adsorber; at the same time the DCS opens the switch valve on the pressurizing gas pipeline; the flow regulator on the second air main pipe measures a loss in flow rate of dry air flowing towards the air separation cold box, and regulates a degree of opening of the control valve of the pressurizing gas pipeline according to the loss in flow rate, such that the pressurizing gas is delivered to the first air main pipe through the pressurizing gas pipeline, to compensate for the loss in flow rate of dry air in the second air main pipe.

10. The method for controlling the pressure equalizing system according to claim 9, further comprising the following steps: once values of the first pressure transmitter and second pressure transmitter are nearly equal, the flow regulator on the second air main pipe measures the loss in flow rate of dry air to be zero, the control valve on the pressurizing gas pipeline is closed, at the same time the DCS closes the switch valve, and the pressure equalizing step of the first adsorber ends.

* * * * *